United States Patent [19]

Lvovsky et al.

[11] Patent Number: 5,159,683

[45] Date of Patent: Oct. 27, 1992

[54] GRAPHICS CONTROLLER ADAPTED TO AUTOMATICALLY SENSE THE TYPE OF CONNECTED VIDEO MONITOR AND CONFIGURE THE CONTROL AND DISPLAY SIGNALS SUPPLIED TO THE MONITOR ACCORDINGLY

[75] Inventors: Lazar Lvovsky, Concord; Alexander S. Lushtak, San Francisco, both of Calif.

[73] Assignee: Western Digital Corporation, Irvine, Calif.

[21] Appl. No.: 405,041

[22] Filed: Sep. 8, 1989

Related U.S. Application Data

[63] Continuation of Ser. No. 891,545, Jul. 29, 1986, abandoned.

[51] Int. Cl.⁵ .................................................. G05F 3/14
[52] U.S. Cl. ................................ 395/500; 364/927.2; 364/926.9; 364/921.9; 364/929.4; 364/DIG. 2; 395/100
[58] Field of Search ... 364/200 MS File, 900 MS File; 395/500, 100

[56] References Cited

U.S. PATENT DOCUMENTS

| | | | |
|---|---|---|---|
| 3,676,858 | 7/1972 | Finch et al. | 364/200 |
| 4,079,452 | 3/1978 | Larson | 364/200 |
| 4,218,740 | 8/1980 | Bennett et al. | 364/200 |
| 4,342,029 | 7/1982 | Hofmanis | 340/747 |
| 4,403,303 | 9/1983 | Howes et al. | 364/900 |
| 4,500,933 | 2/1985 | Chan | 364/900 X |
| 4,575,714 | 3/1986 | Rummel | 364/130 X |
| 4,607,379 | 8/1986 | Marshall, Jr. et al. | 375/121 |
| 4,631,698 | 12/1986 | Walsh et al. | 364/900 |
| 4,641,262 | 2/1987 | Bryan et al. | 364/900 |
| 4,647,912 | 3/1987 | Bates et al. | 340/825.5 |
| 4,670,855 | 6/1987 | Caprio | 364/900 |
| 4,698,770 | 10/1987 | Rattan et al. | 364/900 |
| 4,707,803 | 11/1987 | Anthony | 364/900 |
| 4,788,657 | 11/1988 | Douglas | 364/900 |
| 4,852,041 | 7/1989 | Nakano | 364/900 |
| 4,918,436 | 4/1990 | Johary | 340/744 |
| 4,964,038 | 10/1990 | Louis | 364/200 |

OTHER PUBLICATIONS

Advertisement, PC Magazine, p. 111, vol. 7, No. 7, Apr. 12, 1988.
"EGA, VGA Are the Best for Color Display," The Recorder, p. 12, Jul. 5, 1988, Barry D. Bayer and Mark J. Welch.
IBM Enhanced Graphics Adapter (1984).

*Primary Examiner*—Thomas C. Lee
*Assistant Examiner*—Eric Coleman
*Attorney, Agent, or Firm*—Pretty, Schroeder, Brueggemann & Clark

[57] ABSTRACT

An automatic monitor sensing graphics controller for use with a computer and a display monitor. The display monitor has a specific capability. The controller, mounted within the computer, comprises a plurality of signal lines, a buffer device connected to both the signal lines and the computer, a connector device connected to both the signal lines and the display monitor, and an automatic monitor sensing unit connected to the signal lines for sensing and determining the capability of the display monitor.

20 Claims, 1 Drawing Sheet

GRAPHICS CONTROLLER ADAPTED TO AUTOMATICALLY SENSE THE TYPE OF CONNECTED VIDEO MONITOR AND CONFIGURE THE CONTROL AND DISPLAY SIGNALS SUPPLIED TO THE MONITOR ACCORDINGLY

This application is a continuation, of application Ser. No. 891,545, filed Jul. 29, 1986 now abandoned.

BACKGROUND OF THE INVENTION

1. Field of the Invention

This invention relates to graphics controllers and, more particularly, to an automatic monitor sensing graphics controller.

2. Description of the Related Art

With the advent of personal computers, peripheral devices for enhancing the operation and capability of such personal computers are common in the art. One enhancement feature that is sought by many users is color graphics. Since personal computers such as the various types manufactured by IBM first utilized monochromatic display terminals or monitors, color monitors have been adapted for use with these personal computers. Although earlier types of color monitors have acceptable graphics capabilities, their resolution in relation to textual material was poor. Recently, IBM introduced an enhanced color graphics monitor. In order to use the enhanced graphics monitor, an enhanced graphics adapter must be installed in an existing personal computer. The enhanced graphics adapter (EGA) is described in greater detail in *IBM Enhanced Graphics Adapter* (1984).

As shown in FIG. 1, the EGA, designated 12, is mounted within a personal computer such as the IBM PC, PC/XT or PC/AT. EGA 12, in essence, is a controller that is capable of controlling both color and monochromatic displays. The function and operation of EGA 12 are dependent on the type of monitor that is being used with the personal computer. EGA 12 includes a plurality of signal lines 14, a conventional 8-bit buffer 16, a resistive-capacitive filtering network 18, a 9-pin- connector 20, and a switch 22. If the monitor attached to the computer is an enhanced graphics monitor, the user must place a jumper cable between terminals 1 and 2 of switch 22 so as to permit buffer 16 to transmit signals to pin 2 of connector 20. If the monitor is a monochromatic type or a conventional color type, the jumper will be used to connect terminals 2 and 3 of switch 22 so as to ground line 2. In addition, other switches on EGA 12 must also be used in order to permit it to function with the type of monitor that is attached to the personal computer.

Such manual placement of the jumper and selection of switches are both time consuming and cumbersome. In addition, such manual placement of the jumper and selection of switches increase the possibility of error.

SUMMARY OF THE INVENTION

It is a major object of the present invention to provide an automatic monitor sensing graphics controller that is capable of automatically detecting the type or capability of monitor that is being connected to the personal computer.

It is another object of the present invention to provide an automatic monitor sensing graphics controller that is easy to use and minimizes error.

It is a further object of the present invention to provide an automatic monitor sensing graphics controller that is capable of operating with all types of monitors.

Accordingly, the present invention provides an automatic monitor sensing graphics controller for use with a computer and a display monitor. The display monitor has a specific capability. The controller, mounted within the computer, comprises a plurality of signal lines, a buffer device connected to both the signal lines and the computer, a connector device connected to both the signal lines and the display monitor, and an automatic monitor sensing unit connected to the signal lines for sensing and determining the capability of the display monitor. The automatic monitor sensing unit includes a first state device for generating a first signal. The first state device is connected to one of the signal lines. The sensing unit also includes a second state device for generating a second signal. The second state device is connected to another one of the signal lines. The sensing unit further includes a recording state device for receiving the first and second signals, which are representative of the capability of the display monitor, so as to permit the controller to generate a switch signal. The controller further comprises a switching device that receives the switch signal and grounds one of the signal lines.

Other objects, features, and advantages of the present invention will appear from the following detailed description of the best mode of a preferred embodiment, taken together with the accompanying drawings.

DESCRIPTION OF THE PREFERRED EMBODIMENT

Figure 1:
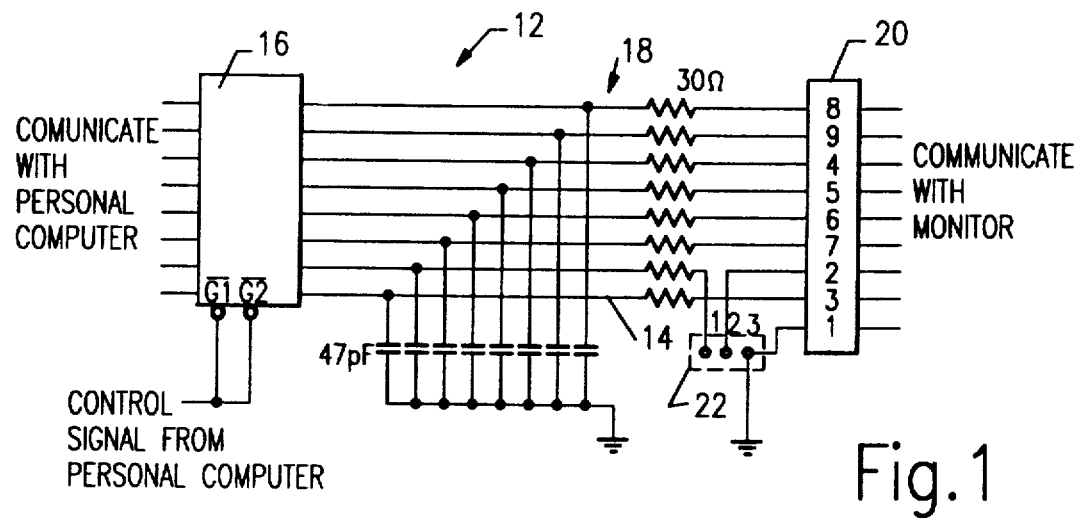
FIG. 1 is a prior art enhanced graphics adapter.
Figure 2:
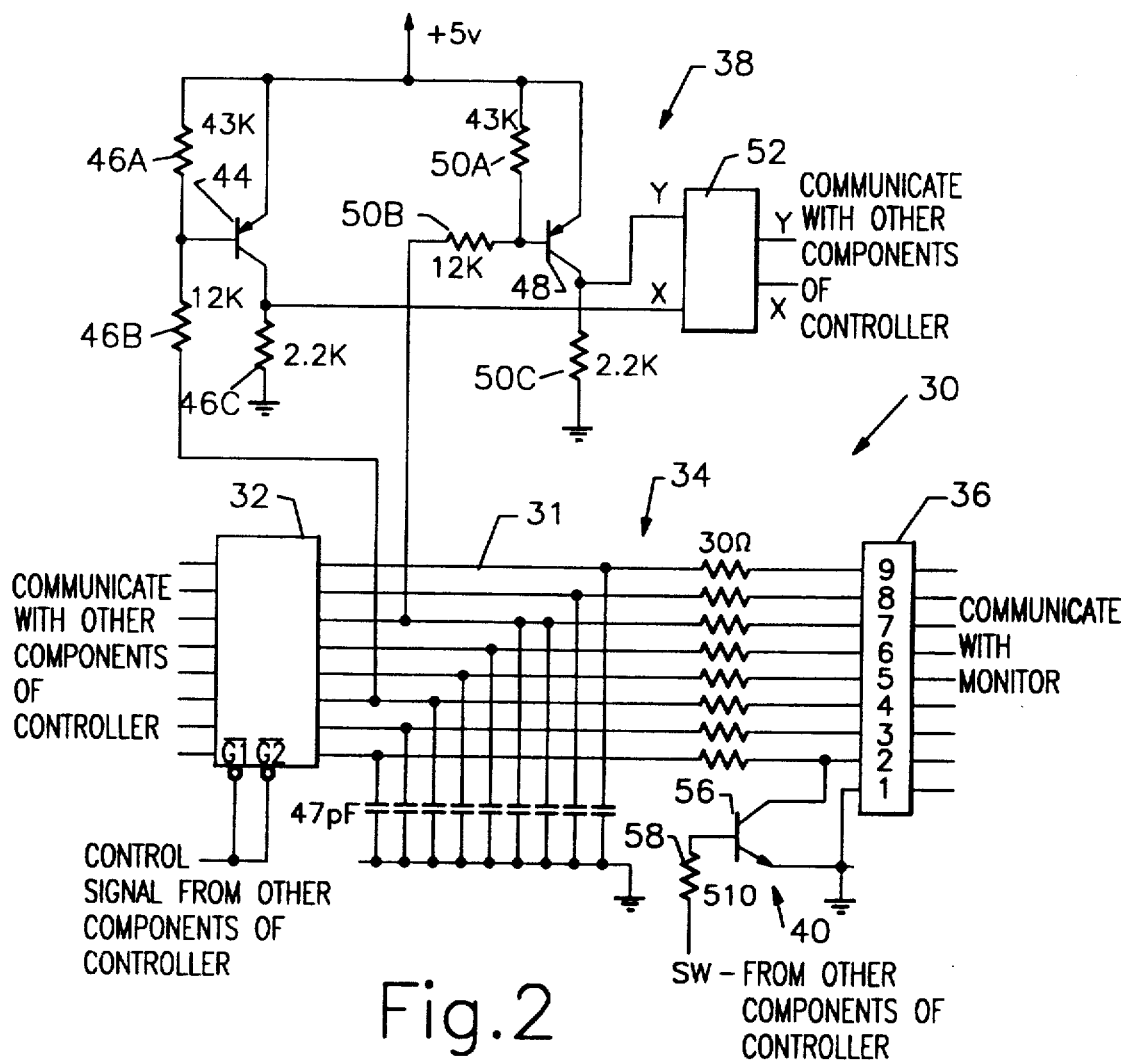
FIG. 2 is an automatic monitor sensing graphics controller of the present invention.

Referring to FIG. 2, there is shown an automatic monitor sensing graphics controller of the present invention, designated 30. Controller 30, which is mounted within and in communication with a conventional personal computer, comprises a plurality of signal lines 31, and a conventional buffer 32 that is connected to signal lines 31. Buffer 32 is also connected to a conventional communications bus which is in communication with other components of controller 30, not shown. Buffer 32 is used to isolate the internal components of the personal computer from other external devices. Controller 30 also comprises a conventional resistive-capacitive filtering network 34, and a 9-pin connector 36 that is in communication with a display terminal or monitor, not shown. Connector 36 is also connected to signal lines 31. The display monitor is characterized as having a specific capability, e.g., the monochromatic type, the conventional color type, or the enhanced color type. Controller 30 further comprises an automatic monitor sensing unit 38 and an automatic switch 40.

In particular, automatic monitor sensing unit 38 includes a first state transistor 44; first state resistors 46A, 46B and 46C; a second state transistor 48; and second state resistors 50A, 50B and 50C. Resistor 46B is connected directly to signal line No. 4, and resistor 50B is connected directly to signal line No. 7. In the alternative, resistor 46B may be connected to either signal line No. 3 or No. 5. Sensing unit 38 also includes a conventional recording state device or register 52. Switch 40 includes a transistor 56 and a resistor 58. The collector and emitter of transistor 56 are connected to signal line No. 2 and the ground, respectively.

Connected to connector 36 is a plurality of wires which are in communication with the monitor. In the preferred embodiment there are nine wires which lead to the monitor. The impedance of these wires, measured at connector 36, may vary with the type of monitor used; for example, 300 ohms to 2.5 kilohms. The signals or connections which are indicative of the capability for each type of the monitor, e.g., monochromatic, conventional color, or enhanced color, are given as follows:

TABLE I

| PIN NUMBER OF CONNECTOR 36 | MONITOR TYPE | | |
|---|---|---|---|
| | MONOCHROMATIC | COLOR | ENHANCED COLOR |
| 1 | GROUND | GROUND | GROUND |
| 2 | GROUND | GROUND | SECONDARY RED |
| 3 | NO CONNECTION | RED | RED |
| 4 | NO CONNECTION | GREEN | GREEN |
| 5 | NO CONNECTION | BLUE | BLUE |
| 6 | INTENSITY | INTENSITY | SECONDARY GREEN |
| 7 | VIDEO | NO CONNECTION | SECONDARY BLUE |
| 8 | HORIZ. SYNC. | HORIZ. SYNC. | HORIZ. SYNC. |
| 9 | VERT. SYNC. | VERT. SYNC. | VERT. SYNC. |

In operation, at the power-on stage of the personal computer, internal devices such as a central processing unit of the personal computer, not shown, would cause buffer 32 to assume a high impedance condition. The operation of buffer 32 is controlled by the presence or absence of a control signal that is presented to pins −G1 and −G2. The sensing of signal lines 31 occurs during the duration that the control signal for buffer 32 is present. For example, if no monitor is connected to connector 36, the impedance on lines 31 is essentially the impedance of the pins of connector 36. In this instance, with buffer 32 having a high impedance, the impedance in lines 31 is essentially the open circuit of connector 36. Thus, no current is flowing through resistor 46B. In turn, transistor 44 is not activated and the output of transistor 44, the voltage across resistor 46C, is at a logical zero. Similarly, transistor 48 is not activated such that its output, the voltage across resistor 50C, is also at a logical zero. The outputs of transistors 44 and 48 thus provide a parallel-by-bit signal comprising first and second logical signals X and Y which represent, in this example, the situation where no monitor is being attached, and are recorded by register 52 which provides a recorded parallel-by-bit signal thereafter forwarded to other components of controller 30, not shown, which are capable of generating a switch signal SW.

If a monochromatic monitor is connected to connector 36, connections at pins 6-9 of connector 36 are terminated at the monitor, permitting the propagating of signals on signal lines Nos. 6-9, as best illustrated in Table I. Since there are no connections on signal lines Nos. 3-5, and especially line No. 4, no current is flowing through resistor 46B. This causes transistor 44 to maintain the logical zero condition. The presence of a termination on signal line No. 7, however, causes a current flow in the base of transistor 48 via resistor 50B. The current is flowing into an impedance to ground at pin 7 of connector 36. Such an impedance is in the range of approximately 300 ohms to 2.5 kiloohms, permitting controller 30 to accommodate a variety of monitors. The activation of the base of transistor 48 causes the conduction of a current between the emitter and the collector of transistor 48, eventually saturating transistor 48. The output of transistor 48, the voltage across resistor 50C, now has a finite value, designated as a logical one. The outputs of transistors 44 and 48, a logical low and a logical high, respectfully, are stored in register 52. The signals X and Y at the output of register 52 represent the capability of the attached monitor.

If a conventional color monitor is connected to connector 36, terminations would be present on signal lines Nos. 3-5, as best shown in Table I. Since the impedances at pins 3-5 are finite to ground, a current is developed in signal line No. 4, causing a current flow in the base of transistor 44 via resistor 46B. Transistor 44, upon saturation, outputs a logical one. Concurrently, the lack of a connection on signal line No. 7 keeps transistor 48 inactivated, causing it to generate a logical zero. The outputs of transistors 44 and 48, a logical high and a logical low, respectively, are stored in register 52.

If an enhanced color monitor is connected to connector 36, the presence of a termination on signal line No. 4 causes transistor 44 to be activated, generating a logical one. Concurrently, the presence of a termination on signal line No. 7, the "secondary blue" signal, also causes transistor 48 to generate a logical one. The outputs of transistors 44 and 48, both logical highs, are stored in register 52.

The outputs of transistors 44 and 48, and the corresponding states stored in register 52, are as follows:

TABLE II

| X | Y | DEFINITION |
|---|---|---|
| 0 | 0 | NO MONITOR |
| 0 | 1 | MONOCHROMATIC |
| 1 | 0 | COLOR |
| 1 | 1 | ENHANCED COLOR |

Thus, signals X and Y provided by register 52 are forwarded to other components of controller 30, not shown, which, in turn, generate signals in the proper format for the monitor that is attached. With controller 30 in this configuration and especially utilizing automatic monitor sensing unit 38, the prior art manual switches are eliminated.

In addition, the stored values of register 52 are forwarded to the components of controller 30, which in turn generate a switch signal SW that is capable of affecting the switching of switch 40. The truth table for the generation of signal SW is as follows:

TABLE III

| X | Y | SW |
|---|---|---|
| 0 | 0 | 0 |
| 0 | 1 | 1 |
| 1 | 0 | 1 |

TABLE III-continued

| X | Y | SW |
|---|---|----|
| 1 | 1 | 0  |

When controller 30 senses the condition of either no monitor or enhanced color monitor, a low SW signal is generated. If a monochromatic monitor or a conventional color graphics monitor is connected to controller 30, a high SW signal is generated. When a high SW signal is present, it drives transistor 56 into saturation such that the output of signal line No. 2 is grounded. At either the no monitor or enhanced color monitor condition, transistor 56 maintains a high condition at its output, permitting signal line No. 2 to be connected to pin 2 of connector 36. Switch 40, in conjunction with the outputs of gate 54, mimic the operation of switch 20 of the prior art controller.

It will be apparent to those skilled in the art that various modifications may be made within the spirit of the invention and the scope of the appended claims. For example, although the value of conditions X and Y are recorded by register or latch 52 in the preferred embodiment, such recording could also be performed by other devices. The fundamental objective in using register 52 is that conditions X and Y must be held for a sufficiently long duration so as to permit the generation of switch signal SW. Conditions X and Y can also be used by other components of controller 30 for other functions. In addition, the generation of switch signal SW could be performed by a conventional exclusive-or gate.

We claim:

1. A graphics controller for use in a computer to control a display monitor that connects to the computer by way of a plurality of wires for communicating control and display signals, the graphics controller being compatible with any of various types of display monitors, each such type of display monitor having a specific display capability and requiring a specific configuration and format for said signals for normal operation, and each such type of display monitor placing predetermined input impedances upon a defined subset of wires of the plurality of wires, the graphics controller comprising:

a plurality of signal lines each for connecting to a corresponding one of the wires;

circuit means connected to the signal lines for applying test signals to a selected plurality of the signal lines connected via corresponding wires of the defined subset of wires to the connected display monitor, to cause a set of electrical conditions to occur on the signal lines, the electrical conditions resulting directly from the predetermined input impedance of the display monitor and identifying the type of the connected display monitor;

sensing means coupled to the signal lines for sensing the set of electrical conditions that occur on the signal lines; and generating means coupled to the sensing means and responsive to the sensed set of electrical conditions for determining the specific display capability of the connected display monitor and for configuring and formatting control and display signals for connection to selected ones of the plurality of signal lines, for communication to the display monitor.

2. The graphics controller as claimed in claim 1, wherein:
  the circuit means and the signal lines provide current flow paths for current to flow through the input impedances in the display monitor; and
  the sensing means produces logical signals that are representative of the magnitude of the input impedances of the display.

3. The graphics controller as claimed in claim 1, wherein:
  the circuit means causes a unique set of voltage conditions to occur on the signal lines for each type of connected display monitor; and
  the sensing means senses the set of voltage conditions that occur on the signal lines.

4. The graphics controller of claim 1, wherein:
  the sensing means includes
    a plurality of sensing buffers, each connected to a corresponding one of the wires, and
    a plurality of registers, each register corresponding to one of the plurality of sensing buffers and connected to an output of the corresponding sensing buffer, each register having a register output connected to the generating means; and
  each sensing buffer is adapted to provide to the corresponding register a digital signal of a first state, if the impedance seen by the corresponding wire exceeds a predetermined threshold, and of a second state, if the impedance seen by the corresponding wire does not exceed the predetermined threshold.

5. The graphics controller of claim 1, wherein the circuit means includes an output buffer connecting the circuit means to the selected plurality of signal lines, the output buffer providing a high output impedance for each of such signal lines.

6. The graphics controller of claim 5, wherein:
  the circuit means includes
    a connector that connects the wires and the signal lines,
    a resistor along each of the wires, between the output buffer and the connector, each such resistor being small as compared to the corresponding output impedance, and
    a capacitor connecting each of the wires to ground, between the output buffer and the connector; and
  the sensing means includes means for sensing the voltage condition present on each of the signal lines, between the output buffer and the resistor, and for providing a logical signal representative of the sensed voltage to the generating means for determining the specific display capability of the connected display monitor.

7. The graphics controller as claimed in claim 1, wherein:
  the sensing means includes recording means responsive to the sensed set of conditions for recording a state indicative of the specific display capability of the display monitor and for sending said recorded state to the generating means; and
  the generating means generates signals of the proper input format for the display monitor in response to the recorded state.

8. The graphics controller as claimed in claim 7, wherein:
  the circuit means applies the test signals only when control and display signals are not being communicated on the signal lines; and a control or display signal thereafter is communicated to the connected display monitor over at least one of the plurality of signal lines that previously carried a test signal.

9. The graphics controller of claim 7, further comprising means for recognizing initialization of the computer and for directing the circuit means to apply the test signals and the recording means to record the state during the initialization of the computer.

10. The graphics controller as claimed in claim 7, wherein:
the sensing means comprises
means for generating a first logical signal which is representative of the condition of one of said signal lines, and
means for generating a second logical signal which is representative of the condition of another one of said signal lines; and
the recording means includes register means for recording the first and second logical signals to thereafter provide to the generating means a recorded signal which is representative of the specific capability of said display monitor.

11. The graphics controller as claimed in claim 10, further comprising:
a switching device for receiving the recorded signal and grounding a selected one of the signal lines if the parallel-by-bit signal indicates that the display monitor is of a particular capability.

12. A graphics controller for use in a computer to control a display monitor that connects to the computer by way of a plurality of wires for communicating control and display signals, the graphics controller being compatible with any of various types of display monitors, each such type of display monitor providing a terminating impedance for each of the plurality of wires and further having a specific display capability and requiring a specific configuration and format for said signals for normal operation, and each such type of display monitor placing predetermined input impedances upon a defined subset of wires of the plurality of wires, the graphics controller comprising:
a plurality of signal lines each for connecting to a corresponding one of the wires;
circuit means connected to the signal lines for applying electrical current signals to a selected plurality of the signal lines connected via corresponding wires of the defined subset of wires to the connected display monitor, to cause a set of voltage conditions to occur on the signal lines, the voltage conditions resulting directly from the predetermined input impedances of the display monitor and identifying the type of the connected display monitor;
sensing means coupled to the signal lines and operable during an initialization stage of the computer for sensing the set of voltage conditions that occur on the signal lines and for recording a logic signal representative of the sensed set of voltage conditions; and
generating means coupled to the sensing means and responsive to the sensed set of voltage conditions for determining the specific display capability of said display monitor and for configuring and formatting control and display signals for connection to selected ones of the plurality of signal lines, for communication to the display monitor.

13. The graphics controller of claim 12, wherein:
the sensing means includes
a plurality of sensing buffers, each connected to a corresponding one of the wires, and
a plurality of registers, each register corresponding to one of the sensing buffers and connected to an output of a corresponding sensing buffer, each register having a register output connected to the generating means; and
each sensing buffer is adapted to provide to the corresponding register a signal of a first state, if the impedance seen by the corresponding wire exceeds a predetermined threshold, and of a second state, if the load impedance seen by the corresponding wire does not exceed the predetermined threshold.

14. The graphics controller of claim 12, wherein the circuit means includes an output buffer connecting the circuit means to the selected plurality of signal lines, the output buffer providing a high output impedance for each signal line.

15. The graphics controller of claim 14, wherein:
wherein the circuit means includes
a connector that connects the wires and the signal lines,
a resistor along each of the wires, between the output buffer and the connector, each such resistor being small as compared to the corresponding output impedance, and
a capacitor connecting each of the wires to ground, between the output buffer and the connector; and
the sensing means includes means for sensing the electrical condition present on each of the signal lines, between the output buffer and the resistor, and for providing a logical signal representative of the sensed voltage to the generating means for determining the specific display capability of the connected display monitor.

16. The graphics controller of claim 15, wherein:
the sensing means includes
a plurality of sensing buffers, each connected to a corresponding one of the wires, and
a plurality of registers, each register corresponding to one of the sensing buffers and connected to an output of the corresponding sensing buffer, each register having a register output connected to the generating means; and
each sensing buffer is adapted to provide to the corresponding register a digital signal of a first state, if the impedance seen by the corresponding wire exceeds a predetermined threshold, and of a second state, if the impedance seen by the corresponding wire does not exceed the predetermined threshold.

17. A method for communicating control and display signals to a display monitor that connects to a computer by way of a plurality of wires, the method being compatible with any of various types of display monitors, each such type of display monitor having a specific display capability and requiring a specific configuration and format for said signals for normal operation, and each such type of display monitor placing predetermined input impedances upon a defined subset of wires of the plurality of wires, the method comprising the steps of:
providing a plurality of signal lines each for connection to a corresponding one of the wires, a selected plurality of which are connected to the defined subset of wires;

applying test signals to a selected plurality of the signal lines connected via corresponding wires to the connected display monitor, to cause a set of electrical conditions to occur on the signal lines, the set of electrical conditions resulting directly from the predetermined input impedances of the display monitor and identifying the type of the connected display monitor;

sensing the set of electrical conditions that occur on the signal lines; and determining the specific display capability of said display monitor in accordance with the sensed set of electrical conditions sensed in the step of sensing, and configuring and formatting control and display signals for connection to selected ones of the plurality of signal lines, for communication to the display monitor.

18. The method of claim 17, wherein:

the step of applying test signals to a selected plurality of the signal lines includes the step of providing predetermined voltages to the selected plurality of signal lines and thereby creating, for each such line, a voltage bridge between an output impedance of the computer with the input impedance placed by the connected display monitor onto one of the selected plurality of the signal lines; and the step of sensing the set of electrical conditions includes the step of sensing each such voltage appearing across the voltage bridge.

19. A method as claimed in claim 17, wherein:

the method further comprises the step of recording information indicative of the display capability of the display monitor;

the step of applying test signals occurs only when control and display signals are not being communicated on the signal lines; and a control or display signal configured and formatted according to the type of communication permitted with the connected display monitor thereafter is communicated to the connected display monitor over at least one of the plurality of signal lines that previously carried a test signal.

20. A method as claimed in claim 19, wherein the step of sensing occurs only during an initialization stage of the computer.

* * * * *